US011799618B2

(12) United States Patent
Wang et al.

(10) Patent No.: US 11,799,618 B2
(45) Date of Patent: Oct. 24, 2023

(54) SL BWP MISMATCH

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Qing Li, Princeton Junction, NJ (US); Hong Cheng, Basking Ridge, NJ (US); Jelena Damnjanovic, Del Mar, CA (US); Peter Gaal, San Diego, CA (US); Juan Montojo, San Diego, CA (US); Yan Zhou, San Diego, CA (US); Jing Sun, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,164

(22) Filed: Oct. 6, 2021

(65) Prior Publication Data
US 2023/0105766 A1   Apr. 6, 2023

(51) Int. Cl.
*H04L 5/00* (2006.01)
*H04W 4/40* (2018.01)

(52) U.S. Cl.
CPC ............ *H04L 5/0096* (2013.01); *H04W 4/40* (2018.02)

(58) Field of Classification Search
CPC ............ H04W 72/0453; H04W 76/34; H04W 72/0406; H04W 4/40; H04L 1/1812; H04L 5/0098; H04L 5/0096
See application file for complete search history.

(56) References Cited

U.S. PATENT DOCUMENTS

| | | | |
|---|---|---|---|
| 2020/0288434 A1* | 9/2020 | Choi | H04L 5/0091 |
| 2020/0351067 A1* | 11/2020 | Hui | H04W 72/042 |
| 2020/0351859 A1* | 11/2020 | Chae | H04W 72/0406 |
| 2021/0051631 A1* | 2/2021 | Deogun | H04L 5/0098 |
| 2022/0030623 A1* | 1/2022 | Wang | H04W 74/0808 |
| 2022/0070878 A1* | 3/2022 | Lee | H04L 5/0098 |
| 2022/0078822 A1* | 3/2022 | Myung | H04W 72/0453 |
| 2022/0116946 A1* | 4/2022 | Yang | H04L 1/1812 |
| 2022/0201764 A1* | 6/2022 | Myung | H04W 74/0866 |

\* cited by examiner

*Primary Examiner* — Shukri Taha
(74) *Attorney, Agent, or Firm* — Procopio, Cory, Hargreaves & Savitch LLP

(57) ABSTRACT

Methods, apparatuses, and computer-readable storage medium for SL communications are provided. An example method may include transmitting, to a second UE, a SL BWP switching request message requesting a switch from a first BWP to a second BWP. The example method may further include receiving, from the second UE, an SL BWP switching decision message confirming the switch from the first BWP to the second BWP. The example method may further include switching from the first BWP to the second BWP upon receiving the SL BWP switching decision message. The example method may further include transmitting, to the second UE, an SL BWP switching confirmation message confirming the switch from the first BWP to the second BWP. The example method may further include reverting back to the first BWP.

30 Claims, 14 Drawing Sheets

SL BWP MISMATCH

TECHNICAL FIELD

The present disclosure relates generally to communication systems, and more particularly, to sidelink (SL) communication with bandwidth part (BWP).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to transmit, to a second UE, a SL BWP switching request message requesting a switch from a first BWP to a second BWP. The memory and the at least one processor coupled to the memory may be further configured to receive, from the second UE, an SL BWP switching decision message confirming the switch from the first BWP to the second BWP. The memory and the at least one processor coupled to the memory may be further configured to switch from the first BWP to the second BWP upon receiving the SL BWP switching decision message. The memory and the at least one processor coupled to the memory may be further configured to transmit, to the second UE, an SL BWP switching confirmation message confirming the switch from the first BWP to the second BWP. The memory and the at least one processor coupled to the memory may be further configured to revert back to the first BWP based on an expiration of a BWP mismatch timer or based on reception of a BWP information associated with the second UE representing a BWP mismatch between the first UE and the second UE.

In another aspect of the disclosure, a method, a computer-readable medium, and an apparatus at a UE are provided. The apparatus may include a memory and at least one processor coupled to the memory. The memory and the at least one processor coupled to the memory may be configured to receive, from a second UE, a SL BWP switching request message requesting a switch from a first BWP to a second BWP. The memory and the at least one processor coupled to the memory may be further configured to transmit, to the second UE, an SL BWP switching decision message confirming the switch from the first BWP to the second BWP. The memory and the at least one processor coupled to the memory may be further configured to receive, from a third UE, an SL BWP switching confirmation message confirming the switch from the first BWP to the second BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
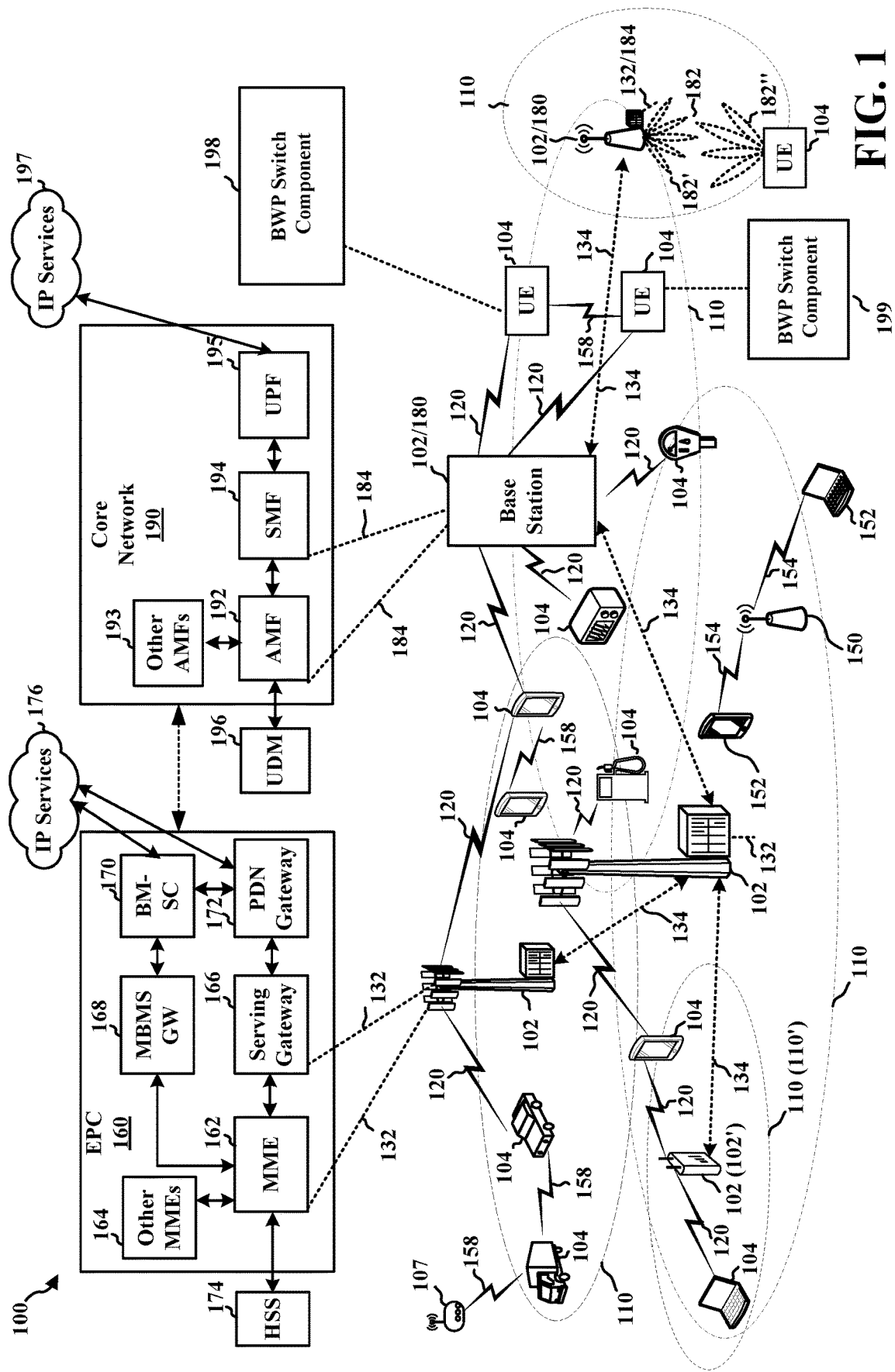
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a BWP switch component 198 configured to transmit, to a second UE, a SL BWP switching request message requesting a switch from a first BWP to a second BWP. The BWP switch component 198 may be further configured to receive, from the second UE, an SL BWP switching decision message confirming the switch from the first BWP to the second BWP. The BWP switch component 198 may be further configured to switch from the first BWP to the second BWP upon receiving the SL BWP switching decision message. The BWP switch component 198 may be further configured to transmit, to the second UE, an SL BWP switching confirmation message confirming the switch from the first BWP to the second BWP. The BWP switch component 198 may be further configured to revert back to the first BWP based on an expiration of a BWP mismatch timer or based on reception of a BWP information associated with the second UE representing a BWP mismatch between the first UE and the second UE.

In some aspects, the UE 104, or other device communicating based on sidelink, may include a BWP switch component 199 configured to receive, from a second UE, a SL BWP switching request message requesting a switch from a first BWP to a second BWP. The BWP switch component 199 may be further configured to transmit, to the second UE, an SL BWP switching decision message confirming the switch from the first BWP to the second BWP. The BWP switch component 199 may be further configured to receive, from a third UE, an SL BWP switching confirmation message confirming the switch from the first BWP to the second BWP.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
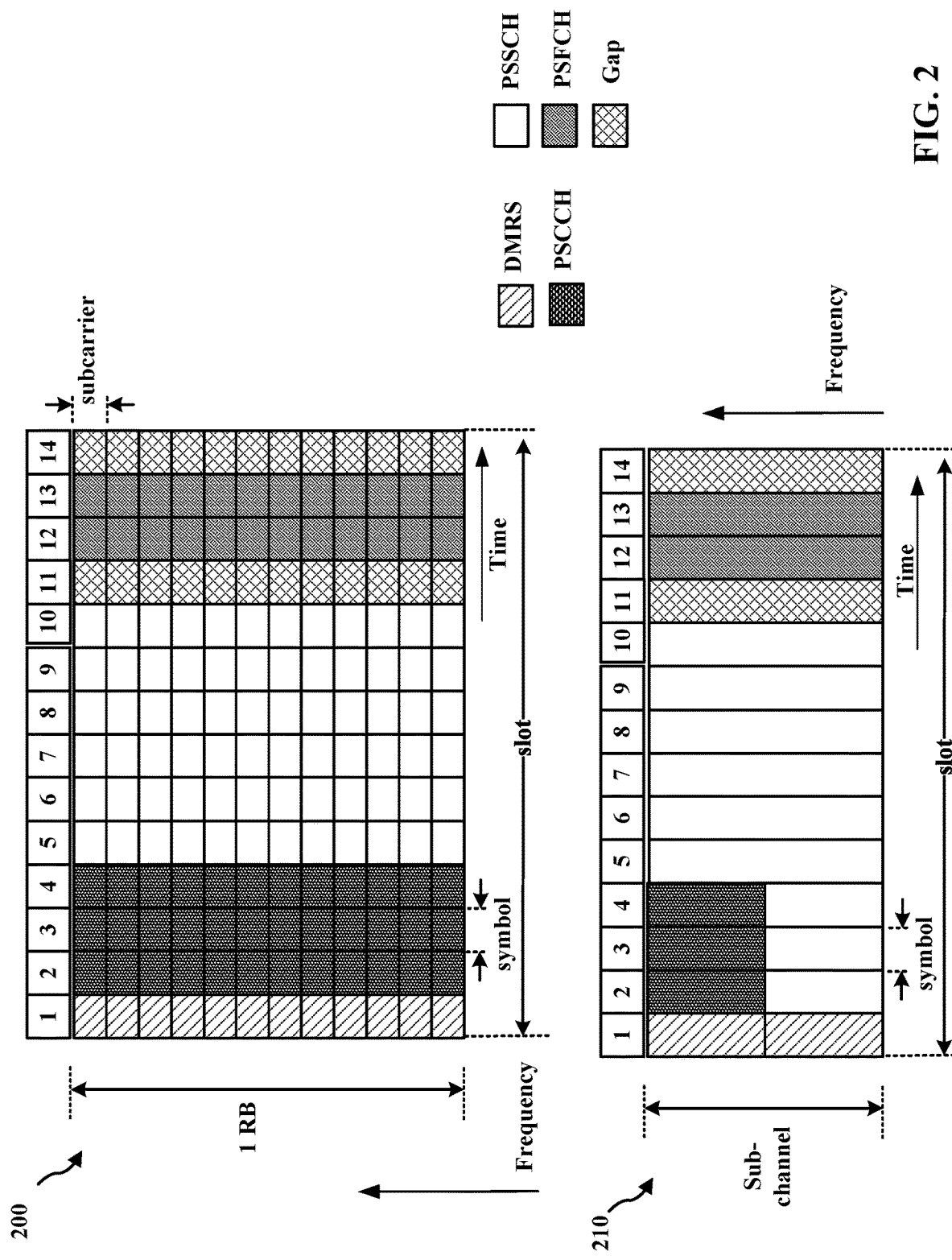
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
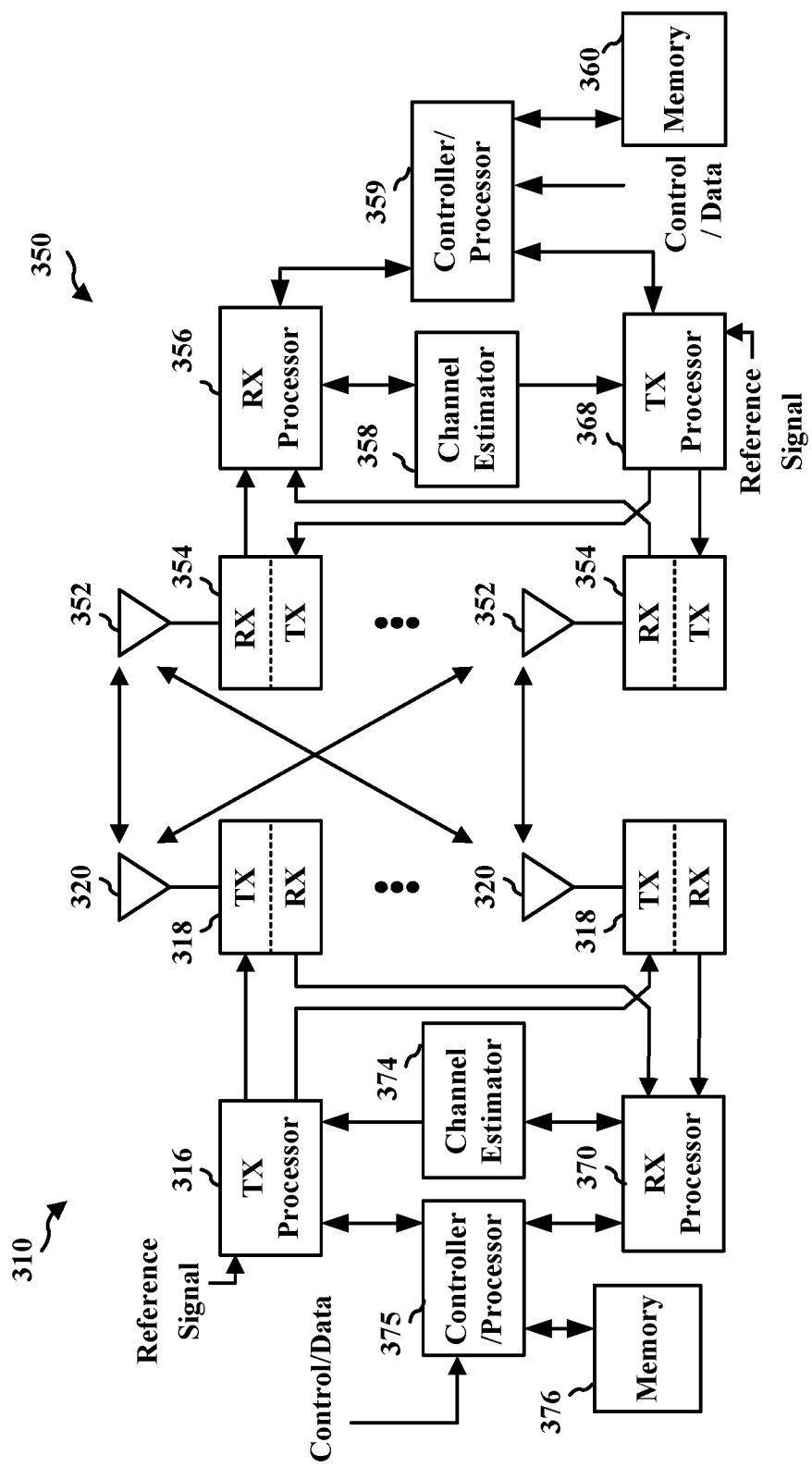
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may include a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with BWP switch component 198 of FIG. 1.

At least one of the TX processor 368, the RX processor 356, and the controller/processor 359 may be configured to perform aspects in connection with BWP switch component 199 of FIG. 1.

Figure 4:
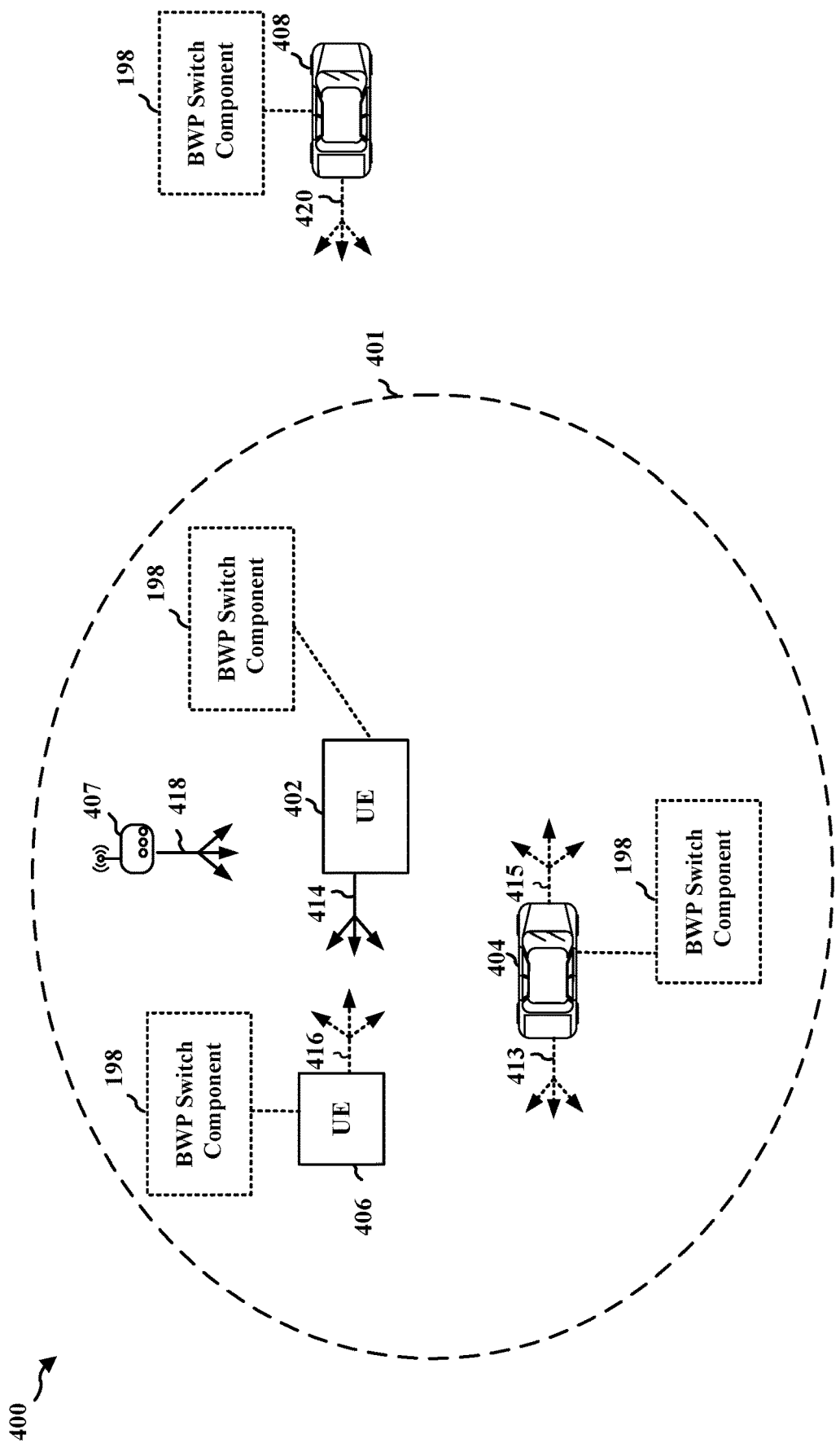
FIG. 4 illustrates example aspects of sidelink communication between devices, in accordance with aspects presented herein.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmissions 413, 415 intended for receipt by other UEs within a range 401 of UE 404, and UE 406 may transmit transmission 416. Additionally/alternatively, RSU 407 may receive communication from and/or transmit transmission 418 to UEs 402, 404, 406, 408. One or more of the UEs 402, 404, 406, 408 or the RSU 407 may include a BWP switch component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (as discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
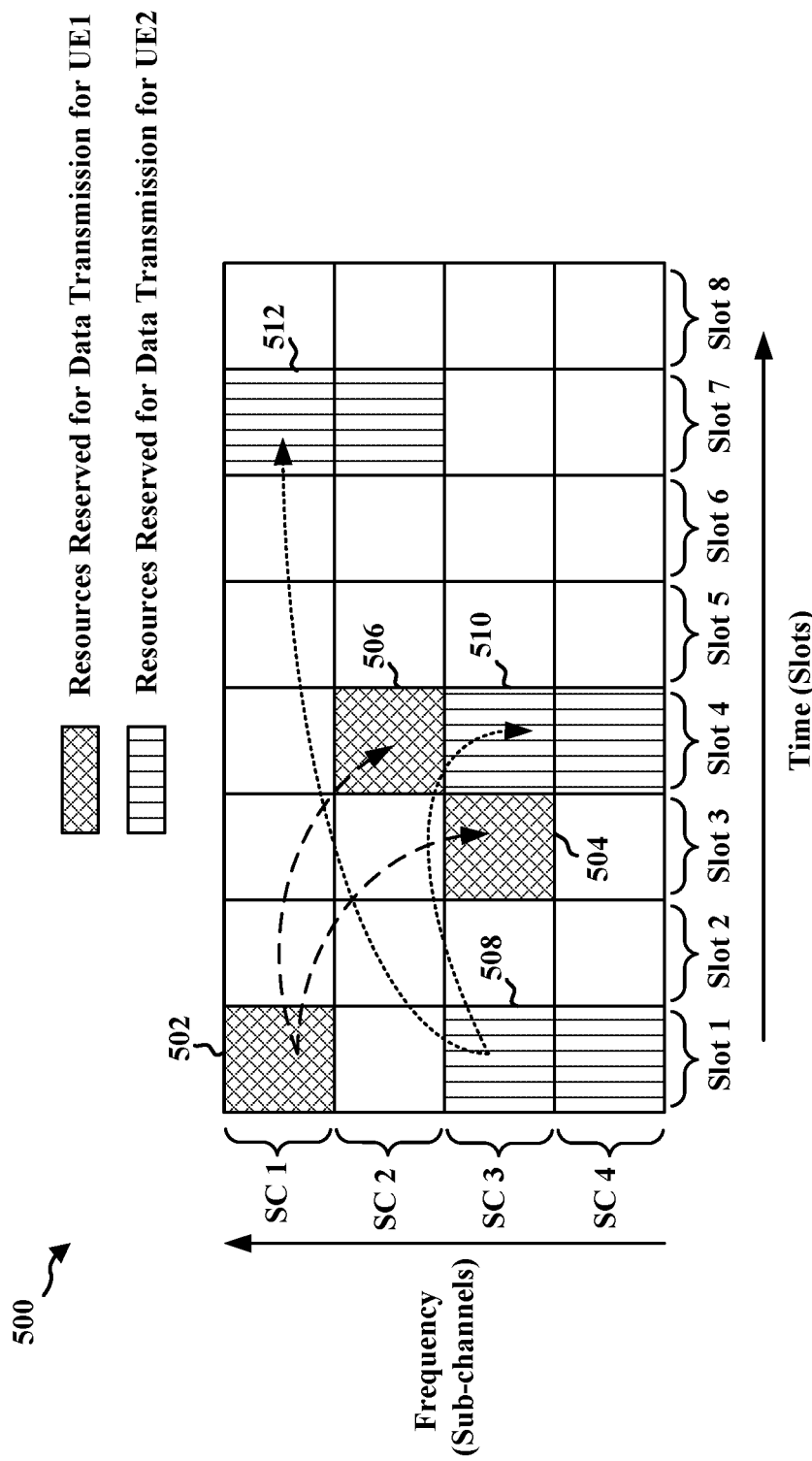
FIG. 5 illustrates examples of resource reservation for sidelink communication.

FIG. 5 is an example 500 of time and frequency resources showing reservations for sidelink transmissions. The resources may be included in a sidelink resource pool, for example. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of pre-defined slots and sub-channels, such as a window including 8 time slots by 4 sub-channels, as shown in example 500, which provides 32 available resource blocks in total. This window may also be referred to as a resource selection window.

A first UE (UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slot 3 and SC 2 at slot 4 for future retransmissions as shown by FIG. 4. UE1 may then transmit information regarding which resources are being used and/or reserved by it to other UE(s). UE1 may do so by including the reservation information in the reservation resource field of the SCI, e.g., a first stage SCI.

FIG. 5 illustrates that a second UE (UE2) reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform a signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508 and data retransmissions 510 and 512.

In some wireless communication systems, SL communications may be configured with one BWP per component carrier (CC). To save power and accommodate for different UE types, such as smartphones, reduced capability UEs, sensors, watches, or other UEs, wireless communication systems may configure more than one BWP in one CC and enable a dynamic switch of an active BWP for a UE. At any time, one BWP may be active for each CC. Therefore, switching mechanisms to enable a dynamic switch of the active BWP may be provided.

Figure 6:
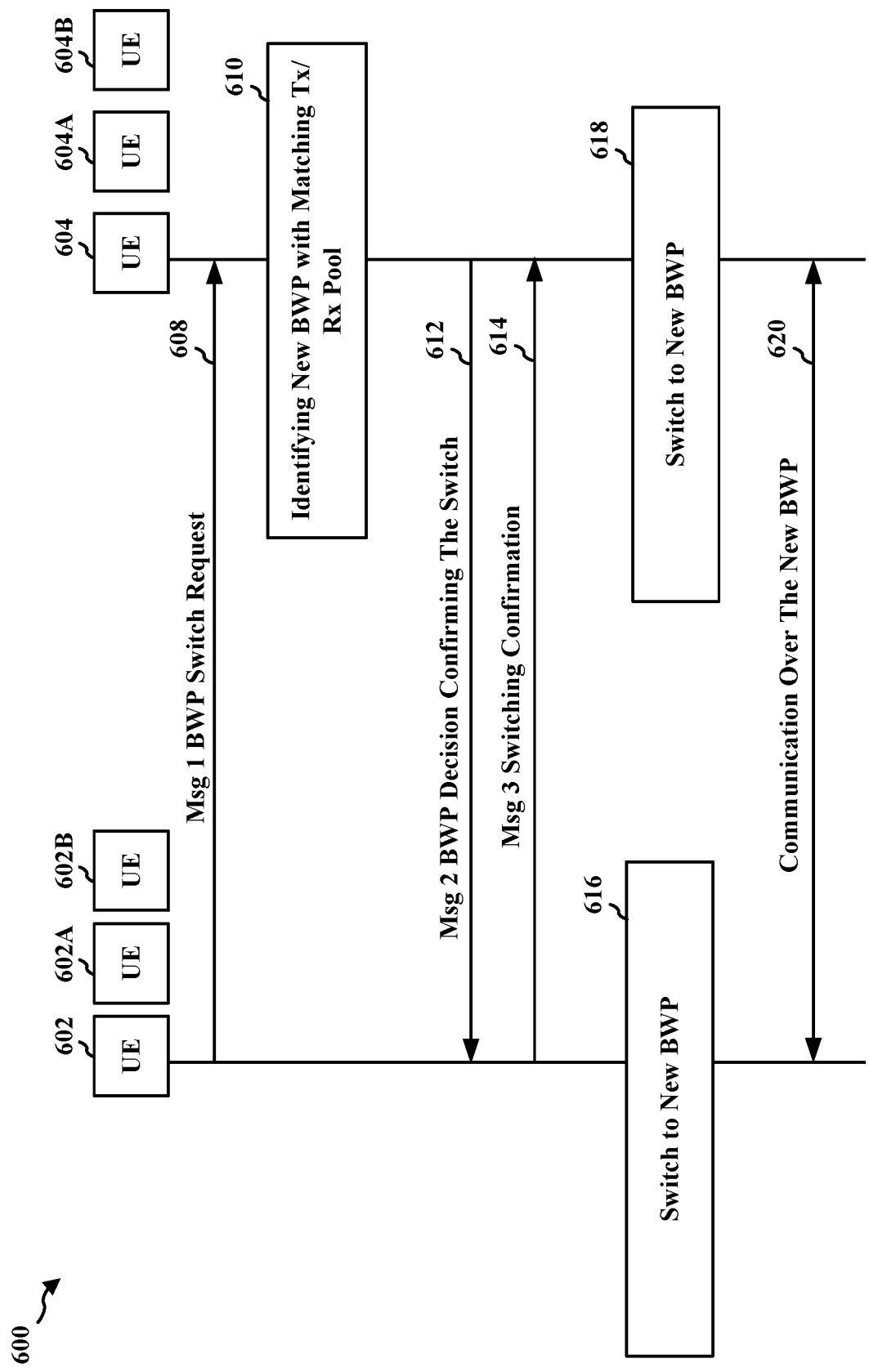
FIG. 6 is a diagram illustrating communication flow between several SL UEs.

FIG. 6 is a diagram 600 illustrating a communication flow between several SL UEs for a switch of BWPs. As illustrated in FIG. 6, to switch a BWP for SL communications between UE 602 and UE 604, the UE 602 may transmit a message 1 (Msg 1) BWP switch request 608 to the UE 604. The Msg 1 BWP switch request 608 may indicate a request to switch to a new BWP for SL communications between UE 602 and UE 604 and may include transmission (Tx) or reception (Rx) pool information in a new BWP. For example, the Msg 1 BWP switch request 608 may include a BWP index if potential new BWPs to switch to are known to the UE 604. In another example, the Msg 1 BWP switch request 608 may include BWP information associated with potential new BWPs. The potential new BWPs may be based on BWPs that the UE 602 may be able to switch to. For example, if the UE 602 supports certain BWPs and does not support other BWPs, the UE 602 may indicate the BWPs that the UE 602 supports in the Msg 1 BWP switch request 608. Alternatively, the UE 602 may indicate the BWPs that the UE 602 supports in another message. In some aspects, the UE 602 may transmit the Msg 1 BWP switch request 608 to one or more other peer UEs of the UE 602, such as the UE 602A, the UE 602B, or the like. The term "peer UE" may refer to a UE that communicates via SL with the UE. The Msg 1 BWP switch request 608 may be transmitted via SCI, a medium access control (MAC) control element (CE) (MAC-CE), or the like.

Upon receiving the Msg 1 BWP switch request 608 from the UE 602, the UE 604 may identify, at 610, a new BWP based on a matching Tx/Rx pool associated with the UE 602 and the UE 604. For example, the UE 604 may identify a Tx pool for UE 602 that matches a Rx pool for the UE 604, and identify a Rx pool for UE 602 that matches a Tx pool for the UE 604, based on the UE 604's own BWP information and the BWP information associated with the UE 602. A Tx pool may also be referred to as a "transmission pool" and may refer to a sidelink resource pool that a UE may be capable of transmitting SL communications in, such as a sidelink resource pool defined based on slots in the time domain and sub-channels in the frequency domain. A Rx pool may also be referred to as a "reception pool" and may refer to a sidelink resource pool that a UE may be capable of receiving SL communications in, such as a sidelink resource pool defined based on slots in the time domain and sub-channels in the frequency domain. In some aspects, the UE 604 may identify the new BWP based on communications with other peer UEs, such as UE 604A and UE 604B. For example, the UE 604 may ensure that other SL communications with other peer UEs, such as the UE 604A and the UE 604B, may still continue in the new identified BWP. For example, to ensure that other SL communications with other peer UEs, such as the UE 604A and the UE 604B, may still continue in the new identified BWP, the identified BWP may include a matching Tx/Rx pool between the UE 604 and the other peer UEs.

In some aspects, the UE 604 may not need to switch a BWP if the currently active BWP of the UE 604 already includes the identified new BWP to which the UE 602 may switch. Alternatively, in some aspects, the UE 604 may switch a BWP with the UE 602.

In some aspects, after identifying the new BWP at 610, the UE 604 may transmit a Msg 2 BWP decision 612 confirming the BWP switch to the UE 602. In some aspects, the UE 604 may also transmit the Msg 2 BWP decision 612 confirming the BWP switch to the other peer UEs of UE 604, such as the UE 604A and the UE 604B. In some aspects, the Msg 2 BWP decision 612 confirming the BWP switch may be implicit and transmitted via a PSFCH, such as a PSFCH with one or more bits to indicate BWP information. In some aspects, the Msg 2 BWP decision 612 may include BWP information associated with the identified new BWP. In some aspects, the BWP information may include frequency information. In some aspects, the BWP information may be a BWP index representing BWP information if Tx/Rx pool information associated with the UE 604 is known to the UE 602. In some aspects, one or more other peer UEs of the UE 602, such as the UE 602A and the UE 602B, may also transmit the Msg 2 BWP decision 612 confirming the BWP switch to the UE 602. In some aspects, the Msg 2 BWP decision 612 may be transmitted via SCI or a MAC-CE.

Upon receiving the Msg 2 BWP decision 612 confirming the BWP switch from the UE 604, the UE 602 may transmit a Msg 3 switching confirmation 614 to the UE 604. In some aspects, the UE 602 may also transmit the Msg 3 switching confirmation 614 to the other peer UEs of the UE 602, such as the UE 602A and the UE 602B. In some aspects, the UE 602 may transmit the Msg 3 switching confirmation 614 after receiving the Msg 2 BWP decision 612 confirming the BWP switch from all the other peer UEs of the UE 602, such as UE 602A and UE 602B. In some aspects, if the UE 602 does not receive the Msg 2 BWP decision 612 from a peer UE after a configured period of time, the UE 602 may either resend the Msg 1 BWP switch request 608 to the peer UE or may determine that the peer UE cannot switch and refrain from transmitting the Msg 3 switching confirmation 614. In some aspects, the UE 602 may also transmit the Msg 3 switching confirmation 614 to the other peer UEs of the UE 602, such as the UE 602A and the UE 602B. In some aspects, the Msg 3 switching confirmation 614 may confirm the BWP switch. In some aspects, the UE 602 may be unable to switch to the identified new BWP due to circumstances that may not be known to the UE 604. If the UE 602 is unable to switch to the identified new BWP, the UE 602 may refrain from transmitting the Msg 3 switching confirmation 614, and neither UE 602 nor UE 604 may perform the BWP switch. By way of example, the UE 602 may be unable to switch to the identified new BWP because switching to the identified new BWP may prevent the UE 602 from maintaining SL communication with other peer UEs, such as UE 602A and UE 602B. For example, if the identified new BWP includes a matching Tx/Rx pool between the UE 602 and the other peer UEs, such as UE 602A and UE 602B, the UE 602 may be able to switch to the identified new BWP and may transmit the Msg 3 switching confirmation 614 to the UE 604. If the identified new BWP does not include a matching Tx/Rx pool between the UE 602 and the other peer UEs, such as UE 602A and UE 602B, the UE 602 may be unable to switch to the identified new BWP and may refrain from transmitting the Msg 3 switching confirmation 614 to the UE 604. In some aspects, the Msg 3 switching confirmation 614 may be transmitted via SCI or a MAC-CE. In some aspects, the UE 602 may transmit the Msg 3 switching confirmation 614 to other peer UEs of the UE 602, such as the UE 602A and the UE 602B, via groupcast or broadcast.

After transmitting the Msg 3 switching confirmation 614 to the UE 604, the UE 602 may switch to the new BWP at 616. If the Msg 3 switching confirmation 614 transmitted by the UE 602 is successfully received by the UE 604, the UE 604 may also switch to the new BWP at 618. After both the UE 602 and the UE 604 switches to the new BWP, the UE 602 and the UE 604 may communicate with each other over the new BWP at 620.

In some aspects, if the UE 604 fails to receive the Msg 3 switching confirmation 614, the UE 604 may not switch to the identified new BWP. However, because the UE 602 transmitted the Msg 3 switching confirmation 614 to the UE 604, the UE 602 may switch to the new BWP. Such error may result in a BWP mismatch and a loss of connection. Examples of such error are described in connection with FIG. 8. Aspects provided herein may improve the efficiency of SL communications by providing mechanisms for preventing such BWP mismatch.

Figure 7:
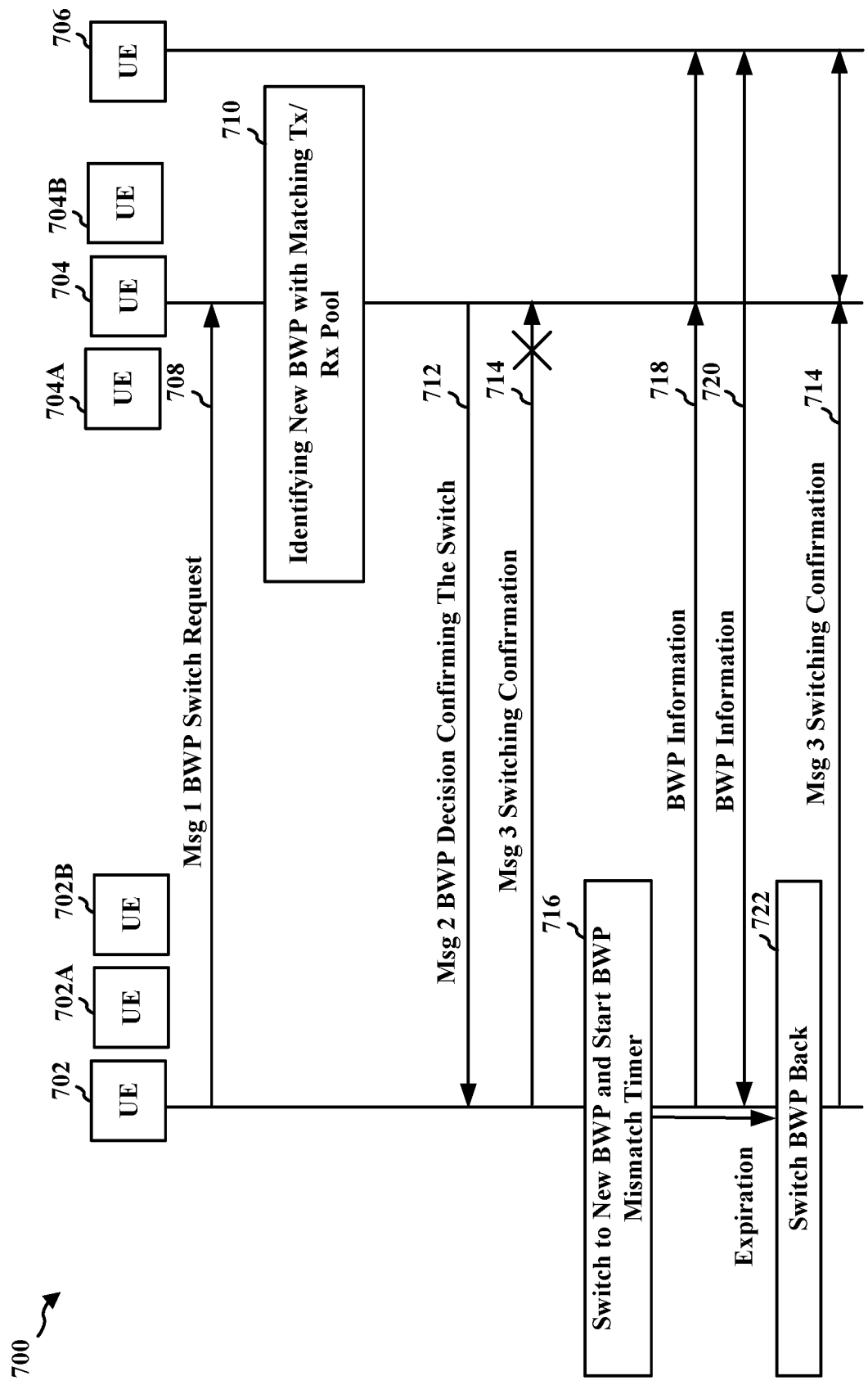
FIG. 7 is a diagram illustrating communication flow between several SL UEs.

FIG. 7 is a diagram 700 illustrating communication flow between several SL UEs for switching of BWPs. As illustrated in FIG. 7, to switch BWPs for SL communications between UE 702 and UE 704, the UE 702 may transmit a Msg 1 BWP switch request 708 to the UE 704. The Msg 1 BWP switch request 708 may indicate a request to switch to a new BWP for SL communications between UE 702 and UE 704 and may include transmission (Tx) or reception (Rx) pool information in a new BWP. For example, the Msg 1 BWP switch request 708 may include a BWP index if potential new BWPs to switch to are known to the UE 704. In another example, the Msg 1 BWP switch request 708 may include BWP information associated with potential new BWPs. The potential new BWPs may be based on BWPs to which the UE 702 may be able to switch. For example, if the UE 702 supports certain BWPs and does not support other BWPs, the UE 702 may indicate the BWPs that the UE 702 supports in the Msg 1 BWP switch request 708. Alternatively, the UE 702 may indicate the BWPs that the UE 702 supports in another message. In some aspects, the UE 702 may transmit the Msg 1 BWP switch request 708 to one or more other peer UEs of the UE 702, such as the UE 702A, the UE 702B, or the like. The term "peer UE" may refer to a UE that communicates via SL with the UE. The Msg 1 BWP switch request 708 may be transmitted via SCI, a medium access control (MAC) control element (CE) (MAC-CE), or the like.

Upon receiving the Msg 1 BWP switch request 708 from the UE 702, the UE 704 may identify, at 710, a new BWP based on a matching Tx/Rx pool associated with the UE 702 and the UE 704. For example, the UE 704 may identify a Tx pool for UE 702 that matches a Rx pool for the UE 704, and identify a Rx pool for UE 702 that matches a Tx pool for the UE 704, based on the UE 704's own BWP information and the BWP information associated with the UE 702. In some aspects, the UE 704 may identify the new BWP based on communications with other peer UEs, such as UE 704A and UE 704B. For example, the UE 704 may ensure that other SL communications with other peer UEs, such as the UE 704A and the UE 704B, may still continue in the new identified BWP. For example, to ensure that other SL communications with other peer UEs, such as the UE 704A and the UE 704B, may still continue in the new identified BWP, the identified BWP may include a matching Tx/Rx pool between the UE 704 and the other peer UEs.

In some aspects, the UE 704 may not need to switch the BWP if the currently active BWP of the UE 704 already includes the identified new BWP that the UE 702 may switch to. Alternatively, in some aspects, the UE 704 may switch BWP with the UE 702.

In some aspects, after identifying the new BWP at 710, the UE 704 may transmit a Msg 2 BWP decision 712 confirming the BWP switch to the UE 702. In some aspects, the UE 704 may also transmit the Msg 2 BWP decision 712 confirming the BWP switch to the other peer UEs of UE 704, such as the UE 704A and the UE 704B. In some aspects, the Msg 2 BWP decision 712 confirming the BWP switch may be implicit and transmitted via a PSFCH, such as a PSFCH with one or more bits to indicate BWP information. In some aspects, the Msg 2 BWP decision 712 may include BWP information associated with the identified new BWP. In some aspects, the BWP information may include frequency information. In some aspects, the BWP information may be a BWP index representing BWP information if Tx/Rx pool information associated with the UE 704 is known to the UE 702. In some aspects, one or more other peer UEs of the UE 702, such as the UE 702A and the UE 702B, may also transmit the Msg 2 BWP decision 712 confirming the BWP switch to the UE 702. In some aspects, the Msg 2 BWP decision 712 may be transmitted via SCI or a MAC-CE.

Upon receiving the Msg 2 BWP decision 712 confirming the BWP switch from the UE 704, the UE 702 may transmit a Msg 3 switching confirmation 714 to the UE 704. In some aspects, the UE 702 may also transmit the Msg 3 switching confirmation 714 to the other peer UEs of the UE 702, such as the UE 702A and the UE 702B. In some aspects, the UE 702 may transmit the Msg 3 switching confirmation 714 after receiving the Msg 2 BWP decision 712 confirming the BWP switch from all the other peer UEs of the UE 702, such as UE 702A and UE 702B. In some aspects, if the UE 702 does not receive the Msg 2 BWP decision 712 from a peer UE after a configured period of time, the UE 702 may either resend the Msg 1 BWP switch request 708 to the peer UE or may determine that the peer UE cannot switch and refrain from transmitting the Msg 3 switching confirmation 714. In some aspects, the UE 702 may also transmit the Msg 3 switching confirmation 714 to the other peer UEs of the UE 702, such as the UE 702A and the UE 702B. In some aspects, the Msg 3 switching confirmation 714 may confirm the BWP switch. In some aspects, the UE 702 may be unable to switch to the identified new BWP due to circumstances that may not be known to the UE 704. If the UE 702 is unable to switch to the identified new BWP, the UE 702 may refrain from transmitting the Msg 3 switching confirmation 714, and neither UE 702 nor UE 704 may perform the BWP switch. By way of example, the UE 702 may be unable to switch to the identified new BWP because switching to the identified new BWP may prevent the UE 702 from maintaining SL communication with other peer UEs, such as UE 702A and UE 702B. For example, if the identified new BWP includes a matching Tx/Rx pool between the UE 702 and the other peer UEs, such as UE 702A and UE 702B, the UE 702 may be able to switch to the identified new BWP and may transmit the Msg 3 switching confirmation 714 to the UE 704. If the identified new BWP does not include a matching Tx/Rx pool between the UE 702 and the other peer UEs, such as UE 702A and UE 702B, the UE 702 may be unable to switch to the identified new BWP and may refrain from transmitting the Msg 3 switching confirmation 714 to the UE 704. In some aspects, the Msg 3 switching confirmation 714 may be transmitted via SCI or a MAC-CE. In some aspects, the UE 702 may transmit the Msg 3 switching confirmation 714 to other peer UEs of the UE 702, such as the UE 702A and the UE 702B, via groupcast or broadcast.

After transmitting the Msg 3 switching confirmation 714 to the UE 704, the UE 702 may switch to the new BWP at 716. If the Msg 3 switching confirmation 714 transmitted by the UE 702 is successfully received by the UE 704, the UE 704 may also switch to the new BWP at 718. After both the UE 702 and the UE 704 switches to the new BWP, the UE 702 and the UE 704 may communicate with each other over the new BWP at 720.

In some aspects, after the Msg 3 switching confirmation 714 to the UE 704, the UE 702 may set a BWP mismatch timer (configured by a base station, the UE 702, or based on a PSFCH configuration of the UE 702) after it sends out SL communication in the new BWP. If there is no matching Tx pool and Rx pool between the UE 702 and the UE 704 in their current active BWP, the UE 702 may assume that the UE 704 did not switch to the new BWP and switch back to the old BWP at 722 (which may involve transmitting a BWP switch request to other peer UEs). The UE 702 may also perform other corrections accordingly. For example, the UE 702 may temporarily switch back to the old BWP, then retransmit Msg 3 switching confirmation 714 to the UE 704.

The UE 702 may inform other peer UEs that the UE 702 may temporarily switch back to the old BWP.

In some aspects, if there is a resource pool in UE 702's new BWP that matches both a resource pool in UE 704's original BWP and a resource pool in UE 704's new BWP, the UE 702 may send SL transmission including BWP information 718 (which may be a BWP index) in the resource pool. After the UE 704 receives the SL transmission including BWP information 718, the UE 704 may compare the BWP information 718 with the identified new BWP, and switch to the BWP accordingly. In some aspects, the UE 704 may also retransmit the UE 704's BWP information 720 after it switches the BWP. In some aspects, if there is such as a resource pool in UE 702's new BWP that matches both a resource pool in UE 704's original BWP and a resource pool in UE 704's new BWP, the UE 702 may retransmit the Msg 3 switching confirmation 714 directly to the UE 704. An example of such resource pool is described in connection with FIG. 9.

In some aspects, if there is a coordinating UE 706 that has a resource pool in its active BWP that has a matching resource pool in UE 702's new BWP and another resource pool in its active BWP that has a matching resource pool in UE 704's BWP, the UE 702 may transmit the SL communication including the BWP information 718 to the UE 704 via the coordinating UE 702. A coordinating UE may be a UE that performs inter-UE coordination. For example, UEs may coordinate among themselves by generating and sharing inter-UE coordination information with other UEs. The inter-UE coordination information may include resource reservation forwarding, information based on a UE's sensing message, inter-UE coordination information from another UE, resources suitable for a UE or to be avoided for a UE, candidate resources for sidelink transmission or suitable resources for transmissions for a UE, or the like. In some aspects, if there is such a coordinating UE 706, the UE may retransmit the Msg 3 switching confirmation 714 to the UE 704 via the UE 706. An example of such a coordinating UE is described in connection with FIG. 10.

Figure 8:
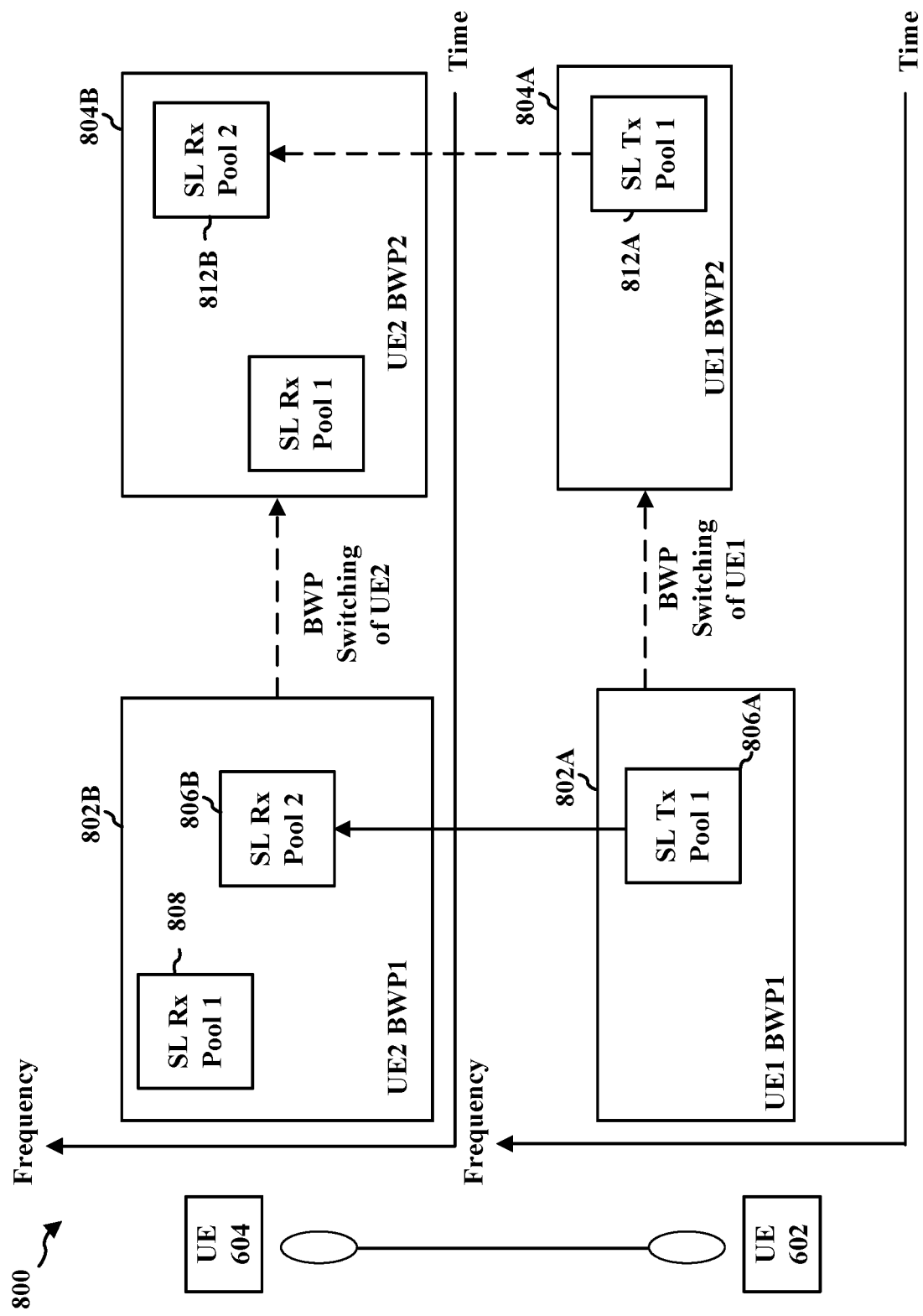
FIG. 8 is a diagram illustrating resource pools of SL UEs.

FIG. 8 is a diagram 800 illustrating resource pools of SL UEs that may result in loss of connections. As illustrated in FIG. 8, the UE 602 may perform BWP switching from a BWP 802A including a SL Tx pool 806A to a BWP 804A that may include a SL Tx Pool 812A. The BWP 802A may correspond with a BWP 802B of the UE 604. The BWP 802B may include a SL Rx pool 808 that does not correspond with a Tx Pool for UE 602, and may also include a SL Rx pool 806B that correspond with the SL Tx pool 806A. The BWP 804A may correspond with a new BWP 804B of the UE 604. The SL Tx pool 812A may correspond with a SL Rx pool 812B of the new BWP 804B. If the UE 604 does not switch from BWP 802B to BWP 804B while the UE 602 switches from BWP 802A to BWP 802B, the UE 602 and the UE 604 may not have a matching Tx/Rx pool anymore because the SL Tx pool 812A may not correspond with any Rx pool in the BWP 802B. Therefore, a loss of connection may occur.

Figure 9:
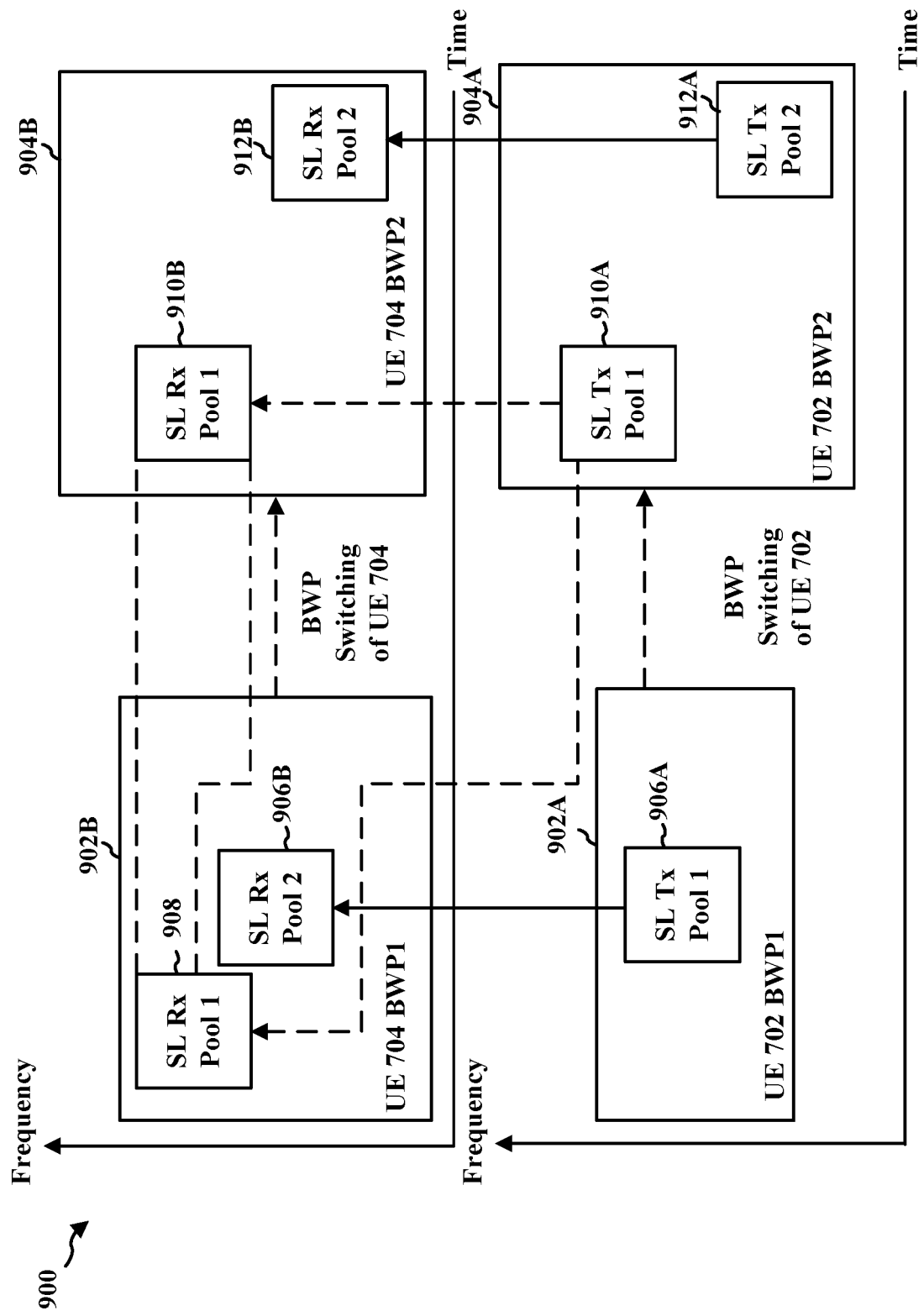
FIG. 9 is a diagram illustrating resource pools of SL UEs.

FIG. 9 is a diagram 900 illustrating resource pools of SL UEs. As illustrated in FIG. 9, the UE 702 may perform BWP switching from a BWP 902A including a SL Tx pool 906A to a BWP 904A that may include a SL Tx pool 910A and a SL Tx Pool 912A. The BWP 802A may correspond with a BWP 902B of the UE 604. The BWP 902B may include a SL Rx pool 908 that corresponds with the SL Tx pool 910A in the BWP 904A, and a SL Rx pool 906B that corresponds with the SL Tx pool 906A in the BWP 902A. The BWP 904A may correspond with a new BWP 904B of the UE 704. The SL Tx pool 912A may correspond with a SL Rx pool 912B of the BWP 904B. The SL Tx pool 910A may correspond with a SL Rx pool 910B of the BWP 904B. After the UE 702 switches BWP to the BWP 904A, the SL Tx pool 910A still matches the SL Rx pool 908 of the UE 704, and the UE 702 may accordingly transmit SL communication including BWP information, or retransmit the Msg 3 switching confirmation, to the UE 702 via the SL Tx pool 910A.

Figure 10:
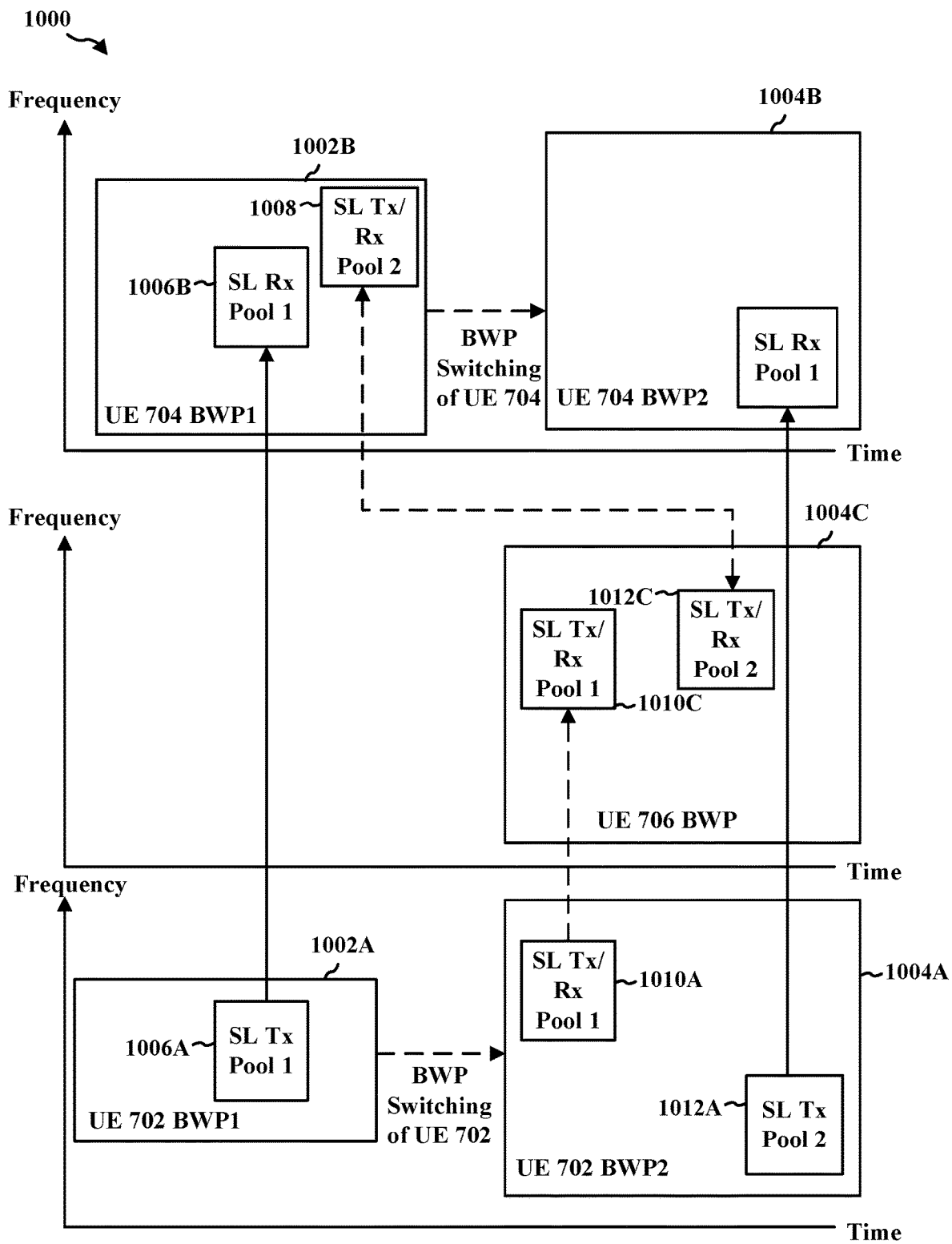
FIG. 10 is a diagram illustrating resource pools of SL UEs.

FIG. 10 is a diagram 1000 illustrating resource pools of SL UEs. As illustrated in FIG. 10, the UE 702 may perform BWP switching from a BWP 1002A including a SL Tx pool 1006A to a BWP 1004A that may include a SL Tx pool 1010A and a SL Tx pool 1012A. The BWP 1002A may correspond with a BWP 1002B of the UE 604. The SL Tx pool 1006A may correspond with a SL Rx pool 1006B. The BWP 1002B may further include a Tx/Rx pool 1008. After the UE 702 switches to the BWP 1004A, the UE 702 no longer has a matching Tx/Rx pool with the UE 704 if the UE 704 did not switch to BWP 1004B. However, the BWP 1004A may include a SL Tx/Rx pool 1010A that may match a UE 706's SL Tx/Rx pool 1010C in an active BWP 1004C of the UE 706. The UE 706's active BWP 1004C may also include a SL Tx/Rx pool 1012C that matches the SL Tx/Rx pool 1008 of the BWP 1002B of the UE 704. Therefore, the UE 702 may accordingly transmit SL communication including BWP information, or retransmit the Msg 3 switching confirmation, to the UE 702 via the coordinating UE 706.

Figure 11:
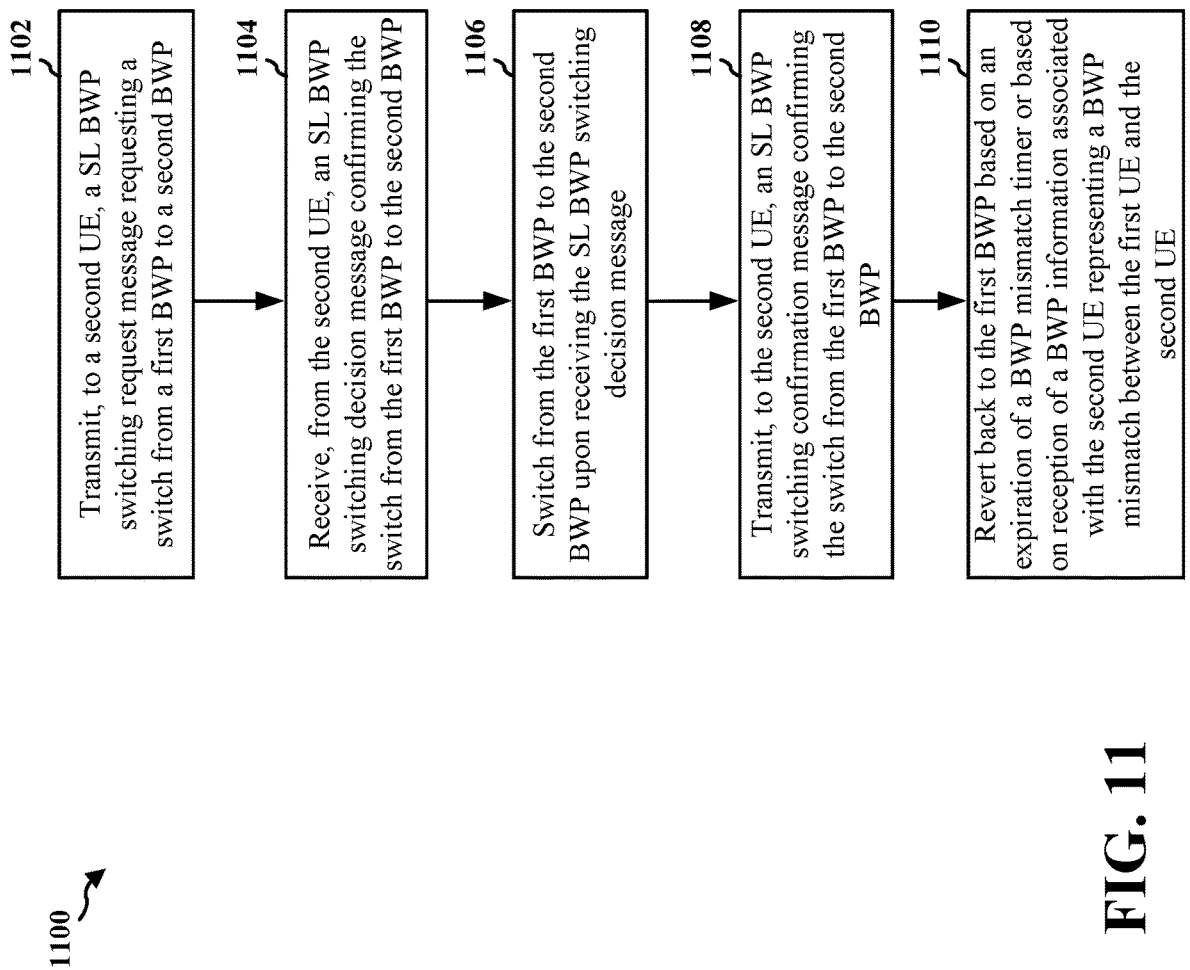
FIG. 11 is a flowchart of a method of wireless communication.

FIG. 11 is a flowchart 1100 of a method of wireless communication. The method may be performed by a first UE (e.g., the UE 104, the UE 702; the apparatus 1402).

At 1102, the UE may transmit, to a second UE, a SL BWP switching request message requesting a switch from a first BWP to a second BWP. For example, the UE 702 may transmit, to a second UE 704, a SL BWP switching request message (e.g., the Msg 1 BWP switch request 708) requesting a switch from a first BWP to a second BWP. In some aspects, 1102 may be performed by switch component 1444 in FIG. 14.

At 1104, the UE may receive, from the second UE, an SL BWP switching decision message confirming the switch from the first BWP to the second BWP. For example, the UE 702 may receive, from the second UE 704, an SL BWP switching decision message (e.g., the Msg 2 BWP decision 712) confirming the switch from the first BWP to the second BWP. In some aspects, 1104 may be performed by switch component 1444 in FIG. 14.

At 1106, the UE may switch from the first BWP to the second BWP upon receiving the SL BWP switching decision message. For example, the UE 702 may switch from the first BWP to the second BWP upon receiving the SL BWP switching decision message at 716. In some aspects, 1106 may be performed by switch component 1444 in FIG. 14.

At 1108, the UE may transmit, to the second UE, an SL BWP switching confirmation message confirming the switch from the first BWP to the second BWP. For example, the UE 702 may transmit, to the second UE 704, an SL BWP switching confirmation message (e.g., the Msg 3 switching confirmation) confirming the switch from the first BWP to the second BWP. In some aspects, 1108 may be performed by switch component 1444 in FIG. 14.

At 1110, the UE may revert back to the first BWP based on an expiration of a BWP mismatch timer or based on reception of a BWP information associated with the second UE representing a BWP mismatch between the first UE and the second UE. For example, the UE 702 may revert back to the first BWP based on an expiration of a BWP mismatch timer or based on reception of a BWP information associated with the second UE representing a BWP mismatch between the first UE and the second UE at 722. In some aspects, 1110 may be performed by revert component 1448 in FIG. 14.

Figure 12:
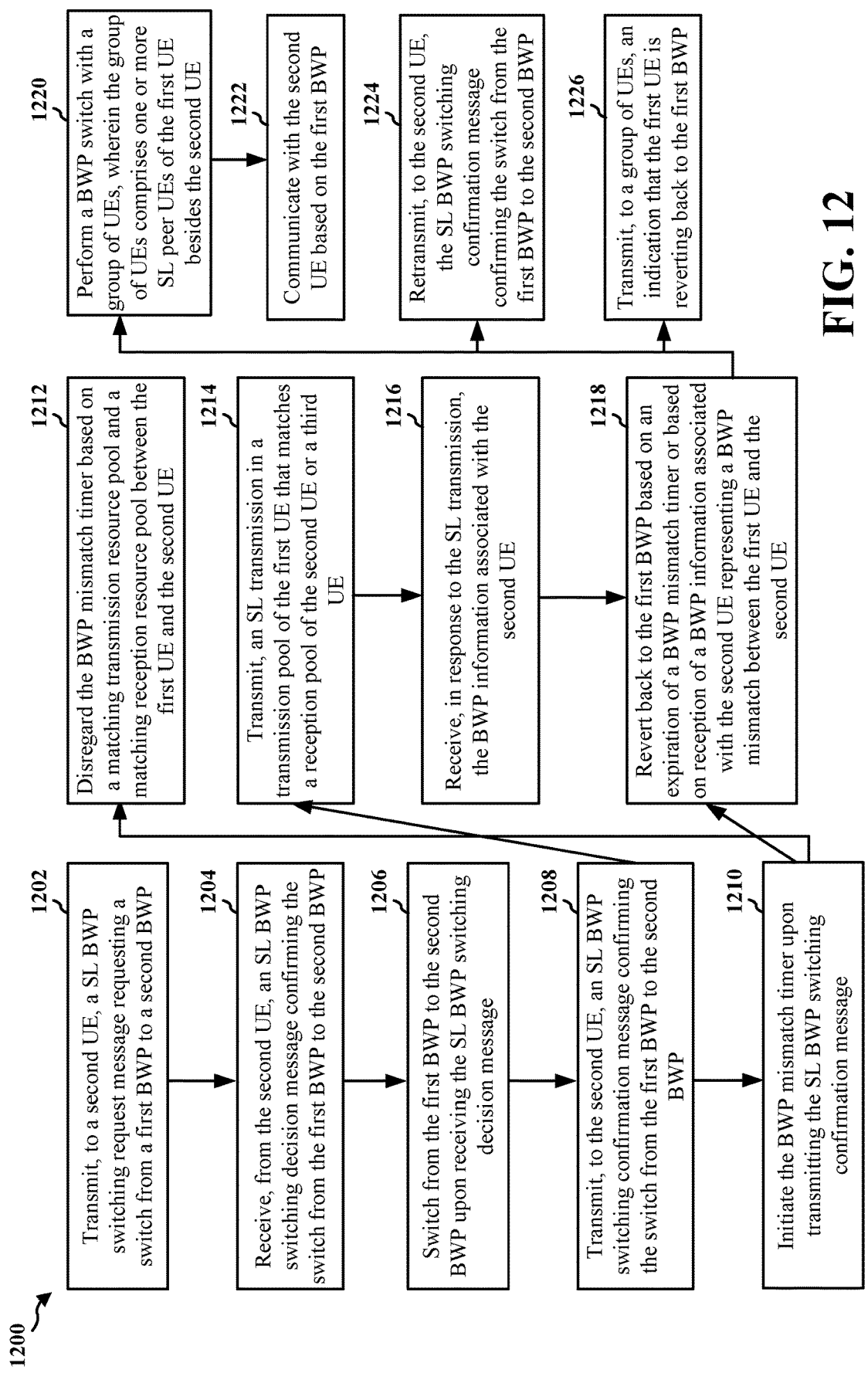
FIG. 12 is a flowchart of a method of wireless communication.

FIG. 12 is a flowchart 1200 of a method of wireless communication. The method may be performed by a first UE (e.g., the UE 104, the UE 702; the apparatus 1402).

At 1202, the UE may transmit, to a second UE, a SL BWP switching request message requesting a switch from a first BWP to a second BWP. For example, the UE 702 may transmit, to a second UE 704, a SL BWP switching request message (e.g., the Msg 1 BWP switch request 708) requesting a switch from a first BWP to a second BWP. In some aspects, 1202 may be performed by switch component 1444 in FIG. 14. In some aspects, the first BWP and the second BWP are associated with a same CC.

At 1204, the UE may receive, from the second UE, an SL BWP switching decision message confirming the switch from the first BWP to the second BWP. For example, the UE 702 may receive, from the second UE 704, an SL BWP switching decision message (e.g., the Msg 2 BWP decision 712) confirming the switch from the first BWP to the second BWP. In some aspects, 1204 may be performed by switch component 1444 in FIG. 14.

At 1206, the UE may switch from the first BWP to the second BWP upon receiving the SL BWP switching decision message. For example, the UE 702 may switch from the first BWP to the second BWP upon receiving the SL BWP switching decision message at 716. In some aspects, 1206 may be performed by switch component 1444 in FIG. 14.

At 1208, the UE may transmit, to the second UE, an SL BWP switching confirmation message confirming the switch from the first BWP to the second BWP. For example, the UE 702 may transmit, to the second UE 704, an SL BWP switching confirmation message (e.g., the Msg 3 switching confirmation) confirming the switch from the first BWP to the second BWP. In some aspects, 1208 may be performed by switch component 1444 in FIG. 14.

At 1210, the UE may initiate the BWP mismatch timer upon transmitting the SL BWP switching confirmation message. For example, the UE 702 may initiate the BWP mismatch timer upon transmitting the SL BWP switching confirmation message at 716. In some aspects, 1210 may be performed by timer component 1446 in FIG. 14. In some aspects, a duration of the BWP mismatch timer may be set by a base station. In some aspects, a duration of the BWP mismatch timer may be set by the first UE. In some aspects, a duration of the BWP mismatch timer may be based on a PSFCH configuration of the first UE.

At 1212, the UE may disregard the BWP mismatch timer based on a matching transmission resource pool and a matching reception resource pool between the first UE and the second UE. For example, the UE 702 may disregard the BWP mismatch timer based on a matching transmission resource pool and a matching reception resource pool between the first UE and the second UE. As one example, disregarding the BWP mismatch timer may include abandoning the timer without taking further actions. In some aspects, 1212 may be performed by timer component 1446 in FIG. 14.

At 1214, the UE may transmit, an SL transmission in a transmission pool of the first UE that matches a reception pool of the second UE or a third UE. For example, the UE 702 may transmit, an SL transmission (e.g., the BWP information 718) in a transmission pool of the first UE that matches a reception pool of the second UE 704 or a third UE 706. In some aspects, the SL transmission (or the BWP information of the UE in the SL transmission) may trigger the second UE to transmit the second UE's BWP information. In some aspects, 1214 may be performed by SL component 1442 in FIG. 14. In some aspects, the UE may transmit, to the second UE, an SL transmission in a transmission pool of the first UE that matches a reception pool of the second UE. In some aspects, the UE may transmit, to a third UE, an SL transmission in a transmission pool of the first UE that matches with a reception pool of the third UE.

At 1216, the UE may receive the BWP information associated with the second UE. For example, the UE 702 may receive the BWP information 720 associated with the second UE 704. In some aspects, 1216 may be performed by SL component 1442 in FIG. 14. In some aspects, the UE may receive, from the second UE in response to the SL transmission, the BWP information associated with the second UE. In some aspects, the UE may receive, from the third UE in response to the SL transmission, the BWP information associated with the second UE.

At 1218, the UE may revert back to the first BWP based on an expiration of a BWP mismatch timer or based on reception of a BWP information associated with the second UE representing a BWP mismatch between the first UE and the second UE. For example, the UE 702 may revert back to the first BWP based on an expiration of a BWP mismatch timer or based on reception of a BWP information associated with the second UE representing a BWP mismatch between the first UE and the second UE at 722. In some aspects, 1218 may be performed by revert component 1448 in FIG. 14.

At 1220, the UE may perform a BWP switch with a group of UEs. The group of UEs may include one or more SL peer UEs of the first UE besides the second UE. For example, the UE 702 may perform a BWP switch with a group of UEs besides the second UE 704. In some aspects, 1220 may be performed by revert component 1448 in FIG. 14.

At 1222, the UE may communicate with the second UE based on the first BWP. For example, the UE 702 may communicate with the second UE 704 based on the first BWP after switching back BWP at 722. In some aspects, 1222 may be performed by SL component 1442 in FIG. 14.

At 1224, the UE may retransmit, to the second UE, the SL BWP switching confirmation message confirming the switch from the first BWP to the second BWP. In some aspects, the second BWP may include a matching resource pool that corresponds with a resource pool in the first BWP. For example, the UE 702 may retransmit, to the second UE 704, the SL BWP switching confirmation message (e.g., the Msg 3 switching confirmation 714) confirming the switch from the first BWP to the second BWP. In some aspects, the UE may retransmit, to the second UE via a third UE, the SL BWP switching confirmation message confirming the switch from the first BWP to the second BWP. In some aspects, 1224 may be performed by switch component 1444 in FIG. 14.

At 1226, the UE may transmit, to a group of UEs, an indication that the first UE is reverting back to the first BWP. For example, the UE 702 may transmit, to a group of UEs, an indication that the first UE is reverting back to the first BWP. In some aspects, 1226 may be performed by revert component 1448 in FIG. 14.

Figure 13:
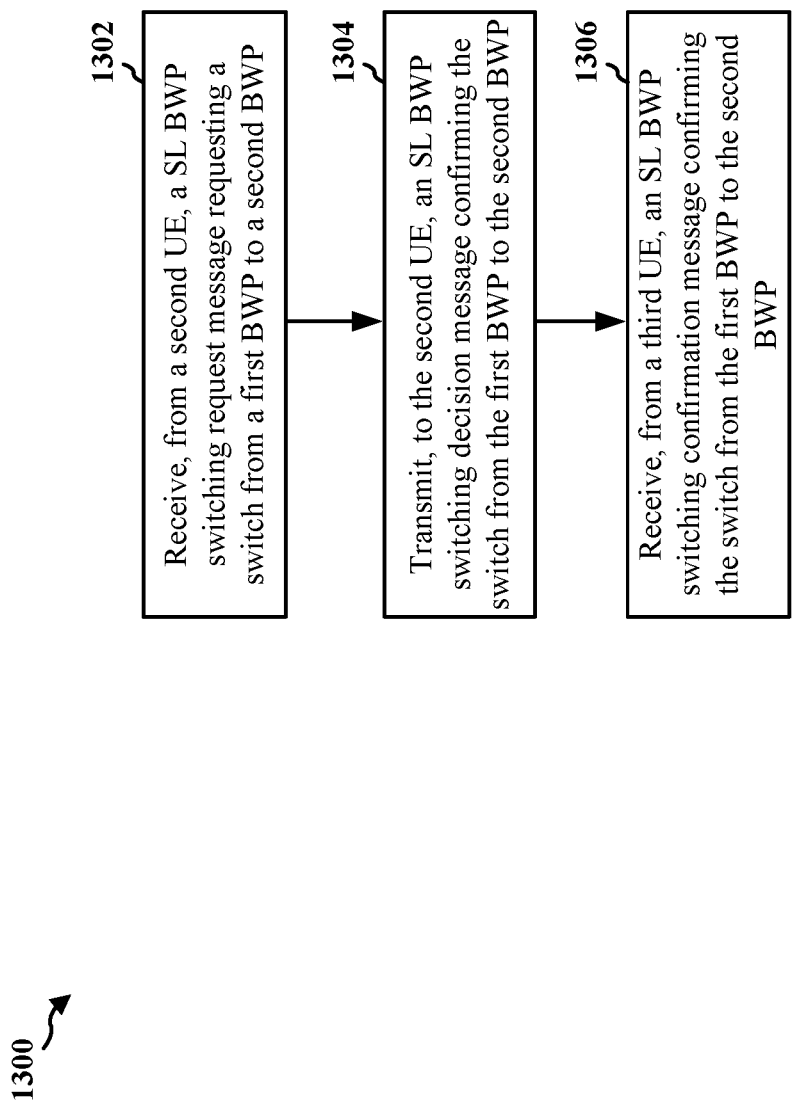
FIG. 13 is a flowchart of a method of wireless communication.

FIG. 13 is a flowchart 1300 of a method of wireless communication. The method may be performed by a UE (e.g., the UE 104, the UE 704; the apparatus 1402).

At 1302, the UE may receive, from a second UE, a SL BWP switching request message requesting a switch from a first BWP to a second BWP. For example, the UE 704 may receive, from a second UE 702, a SL BWP switching request message (e.g., the Msg 1 BWP switch request 708) requesting a switch from a first BWP to a second BWP. In some aspects, 1302 may be performed by switch component 1444 in FIG. 14.

At 1304, the UE may transmit, to the second UE, an SL BWP switching decision message confirming the switch from the first BWP to the second BWP. For example, the UE 704 may transmit, to the second UE 704, an SL BWP switching decision message (e.g., the Msg 2 BWP decision 712) confirming the switch from the first BWP to the second BWP. In some aspects, 1304 may be performed by switch component 1444 in FIG. 14.

At 1306, the UE may receive, from a third UE, an SL BWP switching confirmation message confirming the switch from the first BWP to the second BWP. For example, the UE 704 may receive, from a third UE 706, an SL BWP switching confirmation message (e.g., the Msg 3 switching confirmation 714) confirming the switch from the first BWP to the second BWP. In some aspects, 1306 may be performed by switch component 1444 in FIG. 14.

Figure 14:
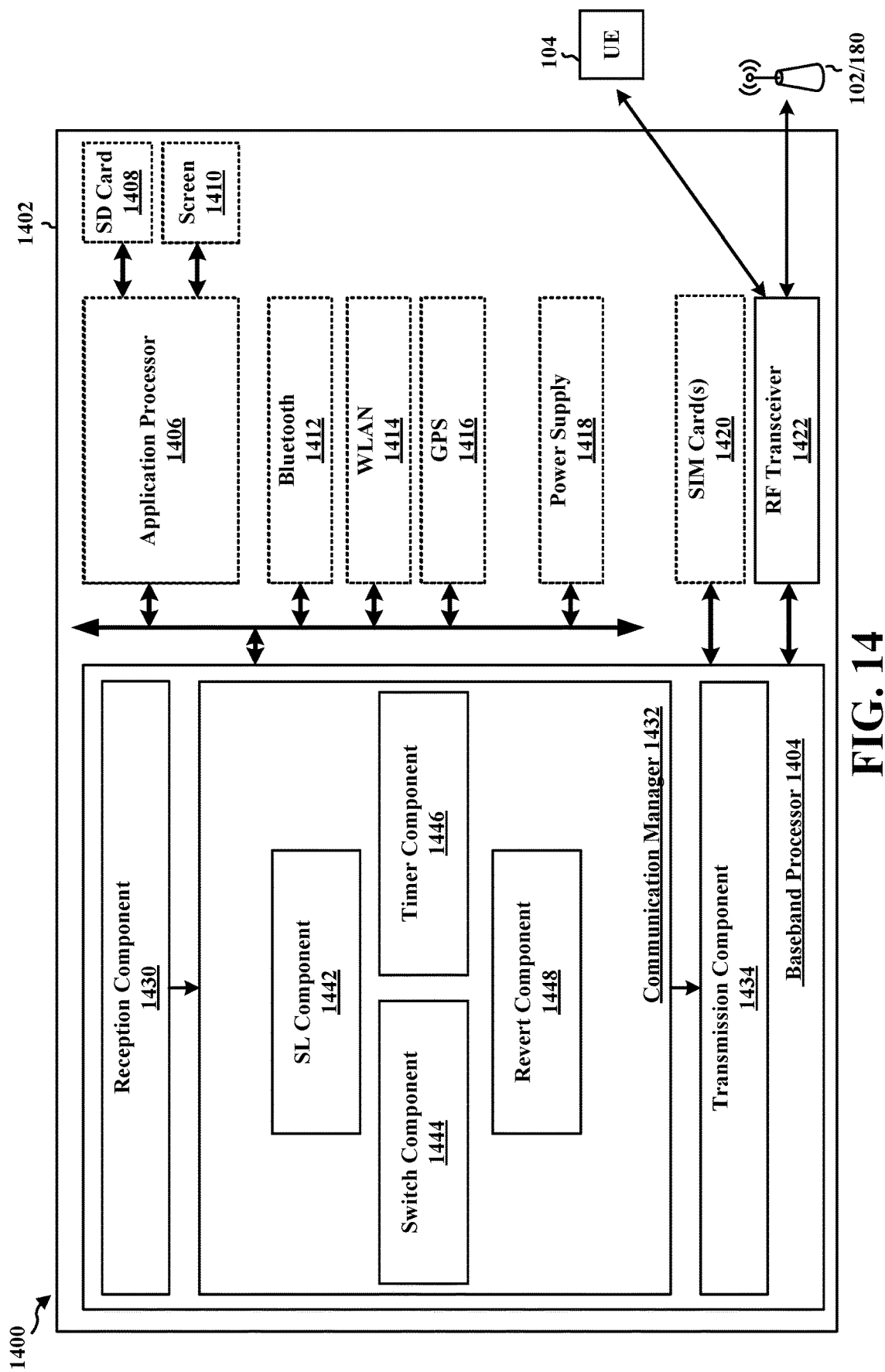
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include an SL component 1442 that is configured to transmit, an SL transmission in a transmission pool of the first UE that matches a reception pool of the second UE or a third UE, e.g., as described in connection with 1214 in FIG. 12. The SL component 1442 may be further configured to receive the BWP information associated with the second UE, e.g., as described in connection with 1216 in FIG. 12. The SL component 1442 may be further configured to communicate with the second UE based on the first BWP, e.g., as described in connection with 1222 in FIG. 12.

The communication manager 1432 may further include a switch component 1444 that may be configured to transmit, to a second UE, a SL BWP switching request message requesting a switch from a first BWP to a second BWP, e.g., as described in connection with 1102 in FIG. 11, or 1202 in FIG. 12. The switch component 1444 may be further configured to receive, from the second UE, an SL BWP switching decision message confirming the switch from the first BWP to the second BWP, e.g., as described in connection with 1104 in FIG. 11, or 1204 in FIG. 12. The switch component 1444 may be further configured to switch from the first BWP to the second BWP upon receiving the SL BWP switching decision message, e.g., as described in connection with 1106 in FIG. 11, or 1206 in FIG. 12. The switch component 1444 may be further configured to transmit, to the second UE, an SL BWP switching confirmation message confirming the switch from the first BWP to the second BWP, e.g., as described in connection with 1108 in FIG. 11, or 1208 in FIG. 12. The switch component 1444 may be further configured to perform a BWP switch with a group of UEs, e.g., as described in connection with 1220 in FIG. 12. The switch component 1444 may be further configured to retransmit, to the second UE, the SL BWP switching confirmation message confirming the switch from the first BWP to the second BWP, e.g., as described in connection with 1224 in FIG. 12. The switch component 1444 may be further configured to receive, from a second UE, a SL BWP switching request message requesting a switch from a first BWP to a second BWP, e.g., as described in connection with 1302 in FIG. 13. The switch component 1444 may be further configured to transmit, to the second UE, an SL BWP switching decision message confirming the switch from the first BWP to the second BWP, e.g., as described in connection with 1304 in FIG. 13. The switch component 1444 may be further configured to receive, from a third UE, an SL BWP switching confirmation message confirming the switch from the first BWP to the second BWP, e.g., as described in connection with 1306 in FIG. 13.

The communication manager 1432 may further include a timer component 1446 that may be configured to initiate the BWP mismatch timer upon transmitting the SL BWP switching confirmation message, e.g., as described in connection with 1210 in FIG. 12. The timer component 1446 may be further configured to disregard the BWP mismatch timer based on a matching transmission resource pool and a matching reception resource pool between the first UE and the second UE, e.g., as described in connection with 1212 in FIG. 12.

The communication manager 1432 may further include a revert component 1448 that may be configured to revert back to the first BWP based on an expiration of a BWP mismatch timer or based on reception of a BWP information associated with the second UE representing a BWP mismatch between the first UE and the second UE, e.g., as described in connection with 1110 in FIG. 11, or 1218 in FIG. 12. The revert component 1448 may be further configured to perform a BWP switch with a group of UEs, e.g., as described in connection with 1220 in FIG. 12. The revert component 1448 may be further configured to transmit, to a group of UEs, an indication that the first UE is reverting back to the first BWP, e.g., as described in connection with 1226 in FIG. 12.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for transmitting, to a second UE, a SL BWP switching request message requesting a switch from a first BWP to a second BWP. The cellular baseband processor 1404 may further include means for receiving, from the second UE, an SL BWP switching decision message confirming the switch from the first BWP to the second BWP. The cellular baseband processor 1404 may further include means for switching from the first BWP to the second BWP upon receiving the SL BWP switching decision message. The cellular baseband processor 1404 may further include means for transmitting, to the second UE, an SL BWP switching confirmation message confirming the switch from the first BWP to the second BWP. The cellular baseband processor 1404 may further include means for reverting back to the first BWP based on an expiration of a BWP mismatch timer or based on reception of a BWP information associated with the second UE representing a BWP mismatch between the first UE and the second UE. The cellular baseband processor 1404 may further include means for initiating the BWP mismatch timer upon transmitting the SL BWP switching confirmation message. The cellular baseband processor 1404 may further include means for disregarding the BWP mismatch timer based on a matching transmission resource pool and a matching reception resource pool between the first UE and the second UE. The cellular baseband processor 1404 may further include means for transmitting, to the second UE, an SL transmission in a transmission pool of the first UE that matches a reception pool of the second UE. The cellular baseband processor 1404 may further include means for receiving, from the second UE, the BWP information associated with the second UE. The cellular baseband processor 1404 may further include means for transmitting, to a third UE, an SL transmission in a transmission pool of the first UE that matches with a reception pool of the third UE. The cellular baseband processor 1404 may further include means for receiving, from the third UE, the BWP information associated with the second UE. The cellular baseband processor 1404 may further include means for performing a BWP switch with a group of UEs. The cellular baseband processor 1404 may further include means for communicating with the second UE based on the first BWP. The cellular baseband processor 1404 may further include means for retransmitting, to the second UE, the SL BWP switching confirmation message confirming the switch from the first BWP to the second BWP The cellular baseband processor 1404 may further include means for transmitting, to a group of UEs, an indication that the first UE is reverting back to the first BWP. The cellular baseband processor 1404 may further include means for retransmitting, to the second UE via a third UE, the SL BWP switching confirmation message confirming the switch from the first BWP to the second BWP. The cellular baseband processor 1404 may further include means for receiving, from a second UE, a SL BWP switching request message requesting a switch from a first BWP to a second BWP. The cellular baseband processor 1404 may further include means for transmitting, to the second UE, an SL BWP switching decision message confirming the switch from the first BWP to the second BWP. The cellular baseband processor 1404 may further include means for receiving, from a third UE, an SL BWP switching confirmation message confirming the switch from the first BWP to the second BWP. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE, comprising: a memory; and at least one processor coupled to the memory and configured to: transmit, to a second UE, a SL BWP switching request message requesting a switch from a first BWP to a second BWP; receive, from the second UE, an SL BWP switching decision message confirming the switch from the first BWP to the second BWP; switch from the first BWP to the second BWP upon receiving the SL BWP switching decision message; transmit, to the second UE, an SL BWP switching confirmation message confirming the switch from the first BWP to the second BWP; and revert back to the first BWP based on an expiration of a BWP mismatch timer or based on reception of a BWP information associated with the second UE representing a BWP mismatch between the first UE and the second UE.

Aspect 2 is the apparatus of aspect 1, wherein the at least one processor coupled to the memory is further configured to: initiate the BWP mismatch timer upon transmitting the SL BWP switching confirmation message; and disregard the BWP mismatch timer based on a matching transmission resource pool and a matching reception resource pool between the first UE and the second UE.

Aspect 3 is the apparatus of any of aspects 1-2, wherein a duration of the BWP mismatch timer is set by a base station.

Aspect 4 is the apparatus of any of aspects 1-3, wherein a duration of the BWP mismatch timer is set by the first UE.

Aspect 5 is the apparatus of any of aspects 1-4, wherein a duration of the BWP mismatch timer is based on a PSFCH configuration of the first UE.

Aspect 6 is the apparatus of any of aspects 1-5, wherein the at least one processor coupled to the memory is further configured to: transmit, to the second UE, an SL transmission in a transmission pool of the first UE that matches a reception pool of the second UE; and receive, from the second UE in response to the SL transmission, the BWP information associated with the second UE.

Aspect 7 is the apparatus of any of aspects 1-6, wherein the at least one processor coupled to the memory is further configured to: transmit, to a third UE, an SL transmission in a transmission pool of the first UE that matches with a reception pool of the third UE; and receive, from the third UE in response to the SL transmission, the BWP information associated with the second UE.

Aspect 8 is the apparatus of any of aspects 1-7, wherein to revert back to the first BWP, the at least one processor coupled to the memory is further configured to:
perform a BWP switch with a group of UEs, wherein the group of UEs comprises one or more SL peer UEs of the first UE besides the second UE; and communicate with the second UE based on the first BWP.

Aspect 9 is the apparatus of any of aspects 1-8, wherein the at least one processor coupled to the memory is further configured to: retransmit, to the second UE, the SL BWP switching confirmation message confirming the switch from the first BWP to the second BWP.

Aspect 10 is the apparatus of any of aspects 1-9, wherein the at least one processor coupled to the memory is further configured to: transmit, to a group of UEs, an indication that the first UE is reverting back to the first BWP, wherein the group of UEs comprises one or more SL peer UEs of the first UE besides the second UE.

Aspect 11 is the apparatus of any of aspects 1-10, wherein the second BWP comprises a matching resource pool that corresponds with a resource pool in the first BWP.

Aspect 12 is the apparatus of any of aspects 1-11, wherein the at least one processor coupled to the memory is further configured to: retransmit, to the second UE via a third UE, the SL BWP switching confirmation message confirming the switch from the first BWP to the second BWP.

Aspect 13 is the apparatus of any of aspects 1-12, wherein the first BWP and the second BWP are associated with a same CC.

Aspect 14 is the apparatus of aspect 1, further comprising a transceiver or an antenna coupled to the at least one processor.

Aspect 15 is an apparatus for wireless communication at a first UE, comprising: a memory; and at least one processor coupled to the memory and configured to: receive, from a second UE, a SL BWP switching request message requesting a switch from a first BWP to a second BWP; transmit, to the second UE, an SL BWP switching decision message confirming the switch from the first BWP to the second BWP; and receive, from a third UE, an SL BWP switching confirmation message confirming the switch from the first BWP to the second BWP.

Aspect 16 is the apparatus of aspect 15, wherein the first BWP and the second BWP are associated with a same CC.

Aspect 17 is the apparatus of any of aspects 15-16, further comprising a transceiver or an antenna coupled to the at least one processor.

Aspect 18 is a method of wireless communication for implementing any of aspects 1 to 14.

Aspect 19 is an apparatus for wireless communication including means for implementing any of aspects 1 to 14.

Aspect 20 is a computer-readable medium storing computer executable code, where the code when executed by a processor causes the processor to implement any of aspects 1 to 14.

Aspect 21 is a method of wireless communication for implementing any of aspects 15 to 17.

Aspect 22 is an apparatus for wireless communication including means for implementing any of aspects 15 to 17.

Aspect 23 is a computer-readable medium storing computer executable code, where the code when executed by a processor causes the processor to implement any of aspects 15 to 17.

What is claimed is:

1. An apparatus for wireless communication at a first user equipment (UE), comprising:
a memory; and
at least one processor coupled to the memory and configured to:
transmit, to a second UE, a sidelink (SL) bandwidth part (BWP) switching request message requesting a switch from a first BWP to a second BWP;
receive, from the second UE, an SL BWP switching decision message confirming the switch from the first BWP to the second BWP;
switch from the first BWP to the second BWP upon receiving the SL BWP switching decision message;

transmit, to the second UE, an SL BWP switching confirmation message confirming the switch from the first BWP to the second BWP after the switch from the first BWP to the second BWP; and revert back to the first BWP based on an expiration of a BWP mismatch timer or based on reception of a BWP information associated with the second UE representing a BWP mismatch between the first UE and the second UE.

2. The apparatus of claim 1, wherein the at least one processor coupled to the memory is further configured to:

initiate the BWP mismatch timer upon transmitting the SL BWP switching confirmation message; and disregard the BWP mismatch timer based on a matching transmission resource pool and a matching reception resource pool between the first UE and the second UE.

3. The apparatus of claim 1, wherein a duration of the BWP mismatch timer is set by a base station.

4. The apparatus of claim 1, wherein a duration of the BWP mismatch timer is set by the first UE.

5. The apparatus of claim 1, wherein a duration of the BWP mismatch timer is based on a physical sidelink feedback channel (PSFCH) configuration of the first UE.

6. The apparatus of claim 1, wherein the at least one processor coupled to the memory is further configured to:

transmit, to the second UE, an SL transmission in a transmission pool of the first UE that matches a reception pool of the second UE; and receive, from the second UE in response to the SL transmission, the BWP information associated with the second UE.

7. The apparatus of claim 1, wherein the at least one processor coupled to the memory is further configured to:

transmit, to a third UE, an SL transmission in a transmission pool of the first UE that matches with a reception pool of the third UE; and receive, from the third UE in response to the SL transmission, the BWP information associated with the second UE.

8. The apparatus of claim 1, wherein to revert back to the first BWP, the at least one processor coupled to the memory is further configured to:

perform a BWP switch with a group of UEs, wherein the group of UEs comprises one or more SL peer UEs of the first UE besides the second UE; and communicate with the second UE based on the first BWP.

9. The apparatus of claim 1, wherein the at least one processor coupled to the memory is further configured to:

retransmit, to the second UE, the SL BWP switching confirmation message confirming the switch from the first BWP to the second BWP.

10. The apparatus of claim 9, wherein the at least one processor coupled to the memory is further configured to:

transmit, to a group of UEs, an indication that the first UE is reverting back to the first BWP, wherein the group of UEs comprises one or more SL peer UEs of the first UE besides the second UE.

11. The apparatus of claim 9, wherein the second BWP comprises a matching resource pool that corresponds with a resource pool in the first BWP.

12. The apparatus of claim 1, wherein the at least one processor coupled to the memory is further configured to:

retransmit, to the second UE via a third UE, the SL BWP switching confirmation message confirming the switch from the first BWP to the second BWP.

13. The apparatus of claim 1, wherein the first BWP and the second BWP are associated with a same component carrier (CC).

14. The apparatus of claim 1, further comprising a transceiver or an antenna coupled to the at least one processor.

15. An apparatus for wireless communication at a first user equipment (UE), comprising:

a memory; and at least one processor coupled to the memory and configured to:

receive, from a second UE, a sidelink (SL) bandwidth part (BWP) switching request message requesting a switch from a first BWP to a second BWP;

transmit, to the second UE, an SL BWP switching decision message confirming the switch from the first BWP to the second BWP; and receive, by the first UE and from a third UE, an SL BWP switching confirmation message confirming the switch from the first BWP to the second BWP.

16. The apparatus of claim 15, wherein the first BWP and the second BWP are associated with a same component carrier (CC).

17. The apparatus of claim 15, further comprising a transceiver or an antenna coupled to the at least one processor.

18. A method for wireless communication at a first user equipment (UE), comprising:

transmitting, to a second UE, a sidelink (SL) bandwidth part (BWP) switching request message requesting a switch from a first BWP to a second BWP;

receiving, from the second UE, an SL BWP switching decision message confirming the switch from the first BWP to the second BWP;

switching from the first BWP to the second BWP upon receiving the SL BWP switching decision message;

transmitting, to the second UE, an SL BWP switching confirmation message confirming the switch from the first BWP to the second BWP after switching from the first BWP to the second BWP; and reverting back to the first BWP based on an expiration of a BWP mismatch timer or based on reception of a BWP information associated with the second UE representing a BWP mismatch between the first UE and the second UE.

19. The method of claim 18, further comprising:

initiating the BWP mismatch timer upon transmitting the SL BWP switching confirmation message; and disregarding the BWP mismatch timer based on a matching transmission resource pool and a matching reception resource pool between the first UE and the second UE.

20. The method of claim 18, wherein a duration of the BWP mismatch timer is set by a base station.

21. The method of claim 18, wherein a duration of the BWP mismatch timer is set by the first UE.

22. The method of claim 18, wherein a duration of the BWP mismatch timer is based on a physical sidelink feedback channel (PSFCH) configuration of the first UE.

23. The method of claim 18, further comprising:

transmitting, to the second UE, an SL transmission in a transmission pool of the first UE that matches a reception pool of the second UE; and receiving, from the second UE in response to the SL transmission, the BWP information associated with the second UE in response to the SL transmission.

24. The method of claim 18, further comprising:
- transmitting, to a third UE, an SL transmission in a transmission pool of the first UE that matches with a reception pool of the third UE; and
- receiving, from the third UE in response to the SL transmission, the BWP information associated with the second UE in response to the SL transmission.

25. The method of claim 18, further comprising reverting back to the first BWP by:
- performing a BWP switch with a group of UEs, wherein the group of UEs comprises one or more SL peer UEs of the first UE besides the second UE; and
- communicating with the second UE based on the first BWP.

26. The method of claim 18, further comprising:
- retransmitting, to the second UE, the SL BWP switching confirmation message confirming the switch from the first BWP to the second BWP.

27. The method of claim 18, further comprising:
- transmitting, to a group of UEs, an indication that the first UE is reverting back to the first BWP, wherein the group of UEs comprises one or more SL peer UEs of the first UE besides the second UE.

28. The method of claim 27, wherein the second BWP comprises a matching resource pool that correspond with a resource pool in the first BWP.

29. The method of claim 18, further comprising:
- retransmitting, to the second UE via a third UE, the SL BWP switching confirmation message confirming the switch from the first BWP to the second BWP.

30. A method for wireless communication at a first user equipment (UE), comprising:
- receiving, from a second UE, a sidelink (SL) bandwidth part (BWP) switching request message requesting a switch from a first BWP to a second BWP;
- transmitting, to the second UE, an SL BWP switching decision message confirming the switch from the first BWP to the second BWP; and
- receiving, by the first UE and from a third UE, an SL BWP switching confirmation message confirming the switch from the first BWP to the second BWP.

* * * * *